US011553409B2

(12) United States Patent
Luo et al.

(10) Patent No.: US 11,553,409 B2
(45) Date of Patent: Jan. 10, 2023

(54) METHOD EXECUTED BY USER EQUIPMENT AND USER EQUIPMENT

(71) Applicants: SHARP KABUSHIKI KAISHA, Sakai (JP); FG Innovation Company Limited, Tuen Mun (HK)

(72) Inventors: Chao Luo, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 109 days.

(21) Appl. No.: 17/263,154

(22) PCT Filed: Jul. 23, 2019

(86) PCT No.: PCT/CN2019/097250
§ 371 (c)(1),
(2) Date: Jan. 26, 2021

(87) PCT Pub. No.: WO2020/020138
PCT Pub. Date: Jan. 30, 2020

(65) Prior Publication Data
US 2021/0168703 A1  Jun. 3, 2021

(30) Foreign Application Priority Data

Jul. 27, 2018 (CN) .......................... 201810851209.7

(51) Int. Cl.
*H04W 48/16* (2009.01)
*H04W 4/70* (2018.01)
(Continued)

(52) U.S. Cl.
CPC ............ *H04W 48/16* (2013.01); *H04W 4/70* (2018.02); *H04W 48/02* (2013.01); *H04W 48/20* (2013.01);
(Continued)

(58) Field of Classification Search
None
See application file for complete search history.

(56) References Cited

U.S. PATENT DOCUMENTS 10,531,445 B2 * 1/2020 Xu ...................... H04W 72/042
2013/0272139 A1 * 10/2013 Guo ................... H04W 76/027
370/242

(Continued)

FOREIGN PATENT DOCUMENTS

CN 102340371 A 2/2012
CN 103858498 A 6/2014
(Continued)

OTHER PUBLICATIONS

Intel Corporation,System information to be provided in NR,3GPP TSG-RAN WG2 NR Meeting #99,Berlin, Germany, Aug. 21-25, 2017,R2-1708828,the whole document.

Primary Examiner — Hong S Cho
(74) Attorney, Agent, or Firm — ScienBiziP, P.C.

(57) ABSTRACT

The present invention provides a method executed by a user equipment and a user equipment, and the method comprises: receiving a radio resource control (RRC) message; determining, according to one or more information elements (IEs) or a portion of one information element (IE) in the RRC message, indication information related to a control region in a subframe and/or an access to a cell; and performing, according to the indication information, processing related to the access to the cell and/or processing related to resource mapping, so as to make the user equipment speed up cell selection and save power consumption.

2 Claims, 5 Drawing Sheets

(51) Int. Cl.
    *H04W 48/02* (2009.01)
    *H04W 52/02* (2009.01)
    *H04W 48/20* (2009.01)
    *H04W 72/04* (2009.01)

(52) U.S. Cl.
    CPC ..... *H04W 52/0209* (2013.01); *H04W 72/042* (2013.01)

(56) References Cited

U.S. PATENT DOCUMENTS

| | | |
|---|---|---|
| 2013/0030315 A1 | 11/2013 | Kim et al. |
| 2015/0163662 A1* | 6/2015 | Klatt .................. H04W 8/183 |
| | | 455/434 |
| 2015/0208394 A1 | 7/2015 | Seo et al. |
| 2017/0134127 A1* | 5/2017 | Peltola ................ H04L 5/0092 |
| 2017/0251353 A1* | 8/2017 | Pinheiro ............... H04W 48/02 |
| 2018/0343682 A1 | 11/2018 | Tang et al. |
| 2019/0349962 A1 | 11/2019 | Kim et al. |

FOREIGN PATENT DOCUMENTS

| | | |
|---|---|---|
| CN | 105634703 A | 6/2016 |
| WO | 2012109790 | 8/2012 |
| WO | 2017132848 | 8/2017 |
| WO | 2018084500 | 5/2018 |

* cited by examiner

METHOD EXECUTED BY USER EQUIPMENT AND USER EQUIPMENT

CROSS-REFERENCE TO RELATED APPLICATION(S)

This application is a national stage application of International Patent Application PCT/CN2019/097250, filed Jul. 23, 2019, now published as WO 2020/020138. International Patent Application PCT/CN2019/097250 claims the benefit of CN Patent Application 201810851209.7, filed Jul. 27, 2018. CN Patent Application 201810851209.7 and International Patent Application PCT/CN2019/097250, now published as WO 2020/020138, are incorporated herein by reference.

FIELD

The present invention relates to the field of wireless communication technology, and more particularly to a method executed by a user equipment, a method executed by a base station, and a corresponding user equipment.

BACKGROUND

At the 3rd Generation Partnership Project (3GPP) RAN #80 plenary meeting held in June 2018, a new work item regarding a further enhanced Machine Type Communication (MTC) was approved (see non-patent document: RP-181450: New WID on Rel-16 MTC enhancements for LTE, hereinafter referred to as Rel-16 eMTC). One of the objectives of Rel-16 eMTC is to support the use of the LTE control region for MPDCCH (MTC physical downlink control channel) and PDSCH (Physical Downlink Shared Channel) transmission under the "stand-alone deployment" scenario for eMTC.

In the existing 3GPP standard specifications, LTE UEs can support different UE categories according to different capabilities. For example, some UEs support eMTC features and/or its evolving features, and these UEs may support Category M1 or Category M2. In the present invention, UEs that support eMTC features (e.g., Category M1 or Category M2) are referred to as MTC UEs, and other UEs (i.e., UEs that do not support eMTC features) are referred to as non-MTC UEs. It should be pointed out that a UE can support eMTC features and other LTE features at the same time, and this type of UE also belongs to MTC UEs in the present invention.

In the existing 3GPP standard specifications, an MTC UE is also referred to as a BL/CE UE, where BL refers to Bandwidth-reduced Low-complexity, and CE refers to Coverage Enhanced.

In the existing 3GPP standard specifications, for a non-MTC UE, each downlink subframe is divided into two parts: a control region and a data region. The control region is mainly used to transmit control signaling of a downlink physical layer, e.g., PCFICH (Physical Control Format Indicator Channel), or PHICH (Physical Hybrid ARQ Indicator Channel), or PDCCH (Physical Downlink Control Channel), and the data region is mainly used to transmit data of a physical layer, e.g., PDSCH. The TTI (Transmission Time Interval) of the non-MTC UE is one millisecond, i.e., the length of one subframe; and the PDCCH transmitted in the control region contains necessary scheduling information for scheduling the PDSCH in the data region of the same subframe. For an MTC UE, the control region cannot be used, and the control signaling is transmitted through MPDCCH rather than PCFICH, PHICH, or PDCCH; and MPDCCH only uses the data region. The TTI of the MTC UE may be much larger than one millisecond. At this time, the MPDCCH and the scheduled PDSCH may be mapped to multiple subframes respectively.

The length of a subframe is one millisecond. With the use of a normal cyclic prefix as an example, a subframe contains fourteen OFDM (Orthogonal Frequency Division Multiplexing) symbols, where the first N symbols are used for the control region while the 14-N remaining symbols are used for the data region. The fourteen OFDM symbols can be numbered (i.e., from 0 to 13) in the entire subframe. Alternatively, a subframe can be divided into two slots, and seven OFDM symbols within each slot can be numbered respectively (i.e., from 0 to 6 in both slots); In the present invention, unless otherwise specified, the latter numbering method is adopted. If a time slot is not specified, it refers to the first time slot, i.e., time slot 0. For the non-MTC UE, the size of N is determined by the CFI (Control Format Indicator) carried by the PCFICH in symbol 0. The taken value of CFI can be 1, 2, 3, or 4, where 4 is a reserved value. When the downlink system bandwidth is greater than 10 physical resource blocks (PRBs), N is equal to the taken value of CFI; and when the downlink system bandwidth is less than or equal to 10 physical resource blocks, N is equal to the taken value of CFI plus 1. For the MTC UE, the value of N is determined by the parameter startSymbolBR in SIB1-BR. The parameter startSymbolBR is used to indicate the position of a starting OFDM symbol of MPDCCH and PDSCH of an MTC UE (except the PDSCH carrying SIB1-BR). When the downlink system bandwidth is greater than ten physical resource blocks, the taken value of parameter startSymbolBR can be 1, 2, or 3; and when the downlink system bandwidth is less than or equal to 10 physical resource blocks, the taken value of parameter startSymbolBR can be 2, 3, or 4.

Another important difference between a non-MTC UE and an MTC UE is the way of reading "System Information Block Type 1 (SIB1)". For the non-MTC UE, the time domain resources used by SIB1, i.e., the subframes 5 of all even-numbered system frames (whose number is referred to as a system frame number, i.e., SFN), are fixed. SIB1 is transmitted through PDSCH, and the PDSCH is scheduled through PDCCH in the same subframe; and the frequency domain bandwidth used by the PDSCH is only limited by the system bandwidth. For the MTC UE, since the radio frequency bandwidth it supports is generally smaller, it may not be able to read a SIB1 used by the non-MTC UE, so the MTC UE uses "SIB1-BR" (System Information Block Type1-BR), which is always transmitted within a relatively small frequency domain bandwidth. The SIB1-BR is scheduled through the field schedulingInfoSIB1-BR in an MIB (Master Information Block).

When a UE attempts to access a certain cell, for a non-MTC UE, the steps it executes for searching the cell and acquiring system information include:
1. detecting PSS (Primary Synchronization Signal);
2. detecting SSS (Secondary Synchronization Signal) and obtain a cell ID;
3. reading MIB carried by PBCH (Physical Broadcast Channel), obtaining a system frame number, a system bandwidth, etc. from the MIB, and determining the boundaries and numbers of frames and subframes in the system;

4. detecting PDCCH, which schedules SIB1, in a subframe where the SIB1 is located and decoding DCI (Downlink Control Information) carried by the PDCCH;
5. decoding the SIB1 carried by PDSCH scheduled by the DCI according to scheduling information in the DCI;
6. decoding other system information according to scheduling information for the other system information in the SIB1.

When a UE attempts to access a certain cell, for an MTC UE, the steps it executes for searching the cell and acquiring system information include:
1. detecting PSS (Primary Synchronization Signal);
2. detecting SSS (Secondary Synchronization Signal) and obtain a cell ID;
3. reading MIB carried by PBCH (Physical Broadcast Channel), obtaining. a system frame number, a system bandwidth, and SIB1-BR scheduling information from the MIB, and determining the boundaries and numbers of frames and subframes in the system;
4. decoding SIB1-BR carried by a corresponding PDSCH according to the SIB1-BR scheduling information;
5. decoding other system information according to scheduling information for the other system information in the SIB1-BR.

In addition, it is worth being pointed out that the non-MTC UE can ignore the SIB1-BR scheduling information in the MIB. For the MTC UE, when the SIB1-BR scheduling information in the MIB takes a predefined special value (0), the UE can consider that SIB1-BR is not sent in the cell. At this time, since the SIB1-BR cannot be acquired, the MTC UE can consider that the cell is barred. In fact, when the MTC UE cannot acquire MIB, SIB1-BR or SIB2, or when the non-MTC UE cannot acquire MIB, SIB1 or SIB2, the UE can consider that the cell is barred.

Under the stand-alone deployment scenario for eMTC, if MPDCCH and PDSCH use the resources in the control region, this means that the control region can no longer be used for transmitting the control signaling carried in channels such as PCFICH, PHICH, PDCCH, etc., that is, the corresponding cell cannot serve the non-MTC UE. In order to speed up the cell selection of the non-MTC UE and save power consumption of the non-MTC UE, the non-MTC UE needs to identify such a cell (under "stand-alone deployment for eMTC") as quick as possible during the processes for searching the cell and acquiring system information. In addition, in order to be compatible with conventional MTC UEs (for example, certain DCI formats are used to allocate resources for both conventional MTC UEs and MTC UEs that can use the control region), certain MTC UEs, even in a cell under stand-alone deployment for eMTC, may still have their MPDCCH allocated with resources according to a conventional method (that is, MPDCCH does not use the control region) and have their PDSCH allocated with resources according to a new method (that is, PDSCH uses the control region).

SUMMARY

In order to solve at least one part of the above-mentioned problems existing in the prior art, the present invention is provided.

The present invention can provide a method executed by a user equipment and a user equipment and can make a user equipment speed up cell selection and save power consumption. For example, the present invention can make a non-MTC UE identify a barred cell under the stand-alone deployment for eMTC as quick as possible, or make a MTC UE identify an accessible cell as quick as possible and perform corresponding processing, so as to speed up cell selection and save power consumption.

In addition, the present invention can provide a method executed by a user equipment and a user equipment and can make a base station allocate resource mapping schemes of different channels for user equipments respectively and perform corresponding processing, so as to enable more flexible and effective use of communication resources.

The present invention provides a method executed by a user equipment (UE), the method comprising: receiving a radio resource control (RRC) message; determining indication information related to a control region in a subframe or an access to a cell according to one or more information elements (IEs) or a portion of one information element (IE) in the RRC message; and performing processing related to the access to the cell or resource mapping according to the indication information.

In the above method, the UE may be a non-machine type communication (MTC) UE that does not support MTC, and the processing comprising at least one of determining whether the cell is barred and determining whether acquiring a system information block type 1, i.e., SIB1, is required.

In the above method, the UE may be a machine type communication (MTC) UE that supports MTC; and the processing comprising at least one of determining the position of a starting orthogonal frequency division multiplexing (OFDM) symbol of an MTC physical downlink control channel (MPDCCH) and determining the position of a starting OFDM symbol of a physical downlink shared channel (PDSCH).

The present invention provides a user equipment (UE) for speeding up cell selection and saving power consumption, the UE comprising: a processor; and a memory configured to store instructions; wherein the instructions, when executed by the processor, may perform the above-mentioned method.

Invention Effect

According to the method executed by a user equipment and the user equipment of the present invention, a user equipment is made able to speed up cell selection and save power consumption. For example, a non-MTC UE is made able to identify a barred cell under the stand-alone deployment for eMTC as quick as possible, or a MTC UE is made able to identify an accessible cell as quick as possible and perform corresponding processing, so as to speed up cell selection and saving power consumption.

In addition, according to the method executed by a user equipment and the user equipment of the present invention, a base station is made able to allocate resource mapping schemes of different channels for user equipments respectively and perform corresponding processing, so as to enable more flexible and effective use of communication resources.

BRIEF DESCRIPTION OF THE DRAWINGS

The above and other features of the present invention will become more apparent through the following detailed description with reference to the accompanying drawings.

DETAILED DESCRIPTION OF THE PREFERRED EMBODIMENTS

The present invention will be described in detail below with reference to the drawings and embodiments. It should be noted that the present invention should not be limited to the embodiments described below. In addition, for the sake of brevity, detailed descriptions of well-known technologies that are not directly related to the present invention are omitted to avoid confusion with the understanding of the present invention.

In the following description, the LTE mobile communication system and its subsequent evolved versions are taken as an exemplary application circumstance, under which several embodiments according to the present invention are described in detail. However, it should be pointed out that the present invention is not limited to the following embodiments but is applicable to other wireless communication systems, such as the 5G mobile communication system and any mobile communication systems released after the 5G mobile communication system.

Some terms of the present invention are described below. Unless otherwise described, the terms related to the present invention are defined hereinafter. Different naming rules in LTE, LTE-Advanced, LTE-Advanced Pro, 5G and later communication systems may be adopted for the terms given by the present invention. The consistent terms are used in the present invention; however, when those terms are applied to specific systems, they can be replaced with terms adopted in a corresponding system.

CFI: Control Format Indicator
DCI: Downlink Control Information
eMTC: Enhanced Machine—Type Communication
IE: Information Element
LTE-A: Long Term Evolution—Advanced
MAC: Medium Access Control
MIB: Master Information Block
MPDCCH: MTC physical downlink control channel
MTC: Machine Type Communication
OFDM: Orthogonal Frequency Division Multiplexing
PBCH: Physical Broadcast Channel
PCFICH: Physical control format indicator channel
PDCCH: Physical downlink control channel
PDSCH: Physical downlink shared channel
PHICH: Physical hybrid ARQ indicator channel
PSS: Primary Synchronization Signal
RE: Resource Element
RRC: Radio Resource Control
SFN: System Frame Number
SSS: Secondary Synchronization Signal
UE: User Equipment Embodiment 1

Figure 1:
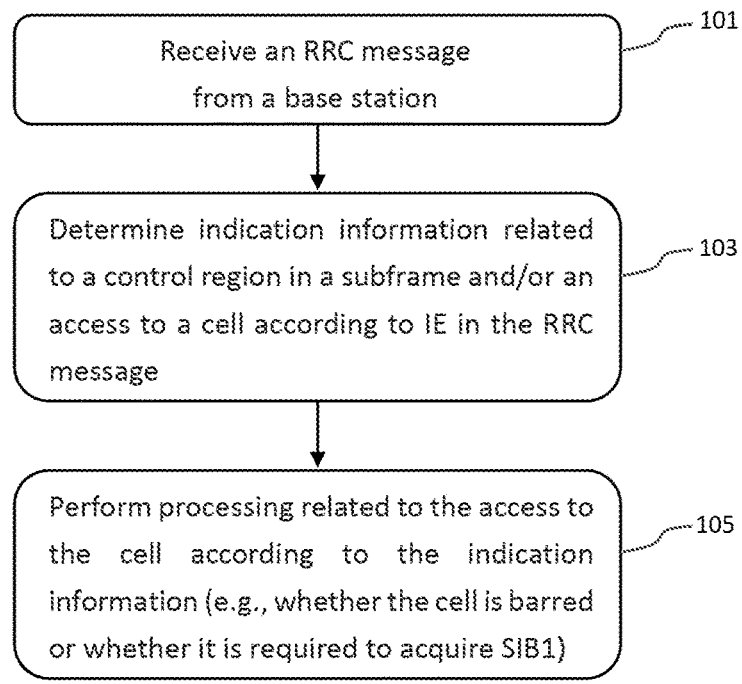
FIG. 1 is a flowchart illustrating a method executed by a user equipment according to a first embodiment of the present invention.

FIG. 1 is a flowchart illustrating a method executed by a user equipment according to a first embodiment of the present invention.

In the first embodiment of the present invention, the user equipment UE executes the following steps:

In step 101, an RRC message is received from, for example, a base station. Optionally, the RRC message may be an MBI. Optionally, the RRC message may be an RRC connection reconfiguration message.

In step 103, indication information related to a control region in a subframe and/or an access to a cell is determined according to one or more information elements (IEs) or a portion of one information element (IE) in the received RRC message. For example, one or more of the following in the indication information is determined:

whether to transmit PDCCH, e.g., whether to transmit PDCCH in the control region.

whether to transmit PCFICH, e.g., whether to transmit PCFICH in the control region.

whether to transmit PHICH, e.g., whether to transmit PHICH in the control region.

whether the length of the control region is 0.

whether the control region exists.

whether the cell is an eMTC dedicated cell, e.g., whether only MTC UE is allowed to access the cell, whether only category M1 UE is allowed to access the cell, whether only category M2 UE is allowed to access the cell, or whether only category M1 UE or category M2 UE is allowed to access the cell.

Optionally, in step 105, processing related to the access to the cell is performed according to the indication information received in step 103; for example, one or more of the following is determined:

whether the cell is barred.

whether it is required to acquire SIB1.

For example, if the indication information indicates one or more of the following:

PDCCH is not transmitted.

PCFICH is not transmitted.

PHICH is not transmitted.

the length of the control region is 0.

the control region does not exist.

the cell is an eMTC dedicated cell.

then one or more of the following is determined:

the cell is barred.

it is not required to acquire SIB1.

For another example, if the indication information indicates one or more of the following:

PDCCH, PCFICH and PHICH are transmitted.

the length of the control region is greater than 0.

the control region exists; for example, a non-zero sized control region exists.

the cell is not an eMTC dedicated cell.

then one or more of the following is determined:
the cell is accessible.
it is required to acquire SIB1.

Optionally, in the first embodiment of the present invention, the term "not transmitted" mentioned may be replaced with the term "not supported", and the term "transmitted" mentioned may be replaced with the term "supported".

Optionally, in the first embodiment of the present invention, the term "does not exist" mentioned may be replaced with the term "does not support", and the term "exist" mentioned may be replaced with the term "support".

Optionally, the UE in the first embodiment of the present invention is a non-MTC UE.

Embodiment 2

Figure 2:
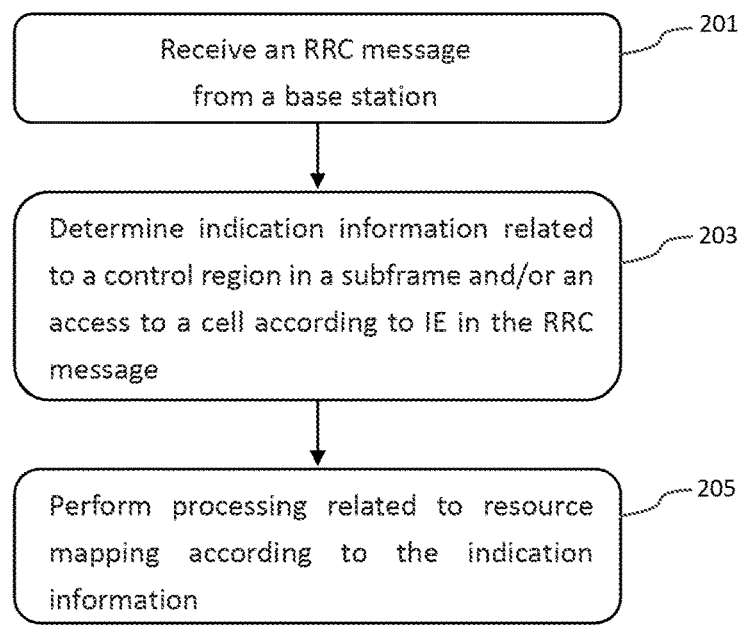
FIG. 2 is a flowchart illustrating a method executed by a user equipment according to a second embodiment of the present invention.

FIG. 2 is a flowchart illustrating a method executed by a user equipment according to a second embodiment of the present invention.

In the second embodiment of the present invention, the user equipment UE executes the following steps:

In step 201, an RRC message is received from, for example, a base station. Optionally, the RRC message may be an MIB. Optionally, the RRC message may be an RRC connection reconfiguration message.

In step 203, indication information related to a control region in a subframe and/or an access to a cell is determined according to one or more information elements (IEs) or a portion of one information element (IE) in the received RRC message. For example, one or more of the following in the indication information is determined:
whether to transmit PDCCH, e.g., whether to transmit PDCCH in the control region.
whether to transmit PCFICH, e.g., whether to transmit PCFICH in the control region.
whether to transmit PHICH, e.g., whether to transmit PHICH in the control region.
whether the length of the control region is 0.
whether the control region exists.
whether the cell is an eMTC dedicated cell, e.g., whether only MTC UE is allowed to access the cell, whether only category M1 UE is allowed to access the cell, whether only category M2 UE is allowed to access the cell, or whether only category M1 UE or category M2 UE is allowed to access the cell.

Optionally, in step 205, processing related to resource mapping is performed according to the indication information received in step 203; for example, one or more of the following is determined:
the position of a starting OFDM symbol of MPDCCH.
the position of a starting OFDM symbol of the PDSCH.

For example, if the indication information indicates one or more of the following:
PDCCH is not transmitted.
PCFICH is not transmitted.
PHICH is not transmitted.
the length of the control region is 0.
the control region does not exist.
the cell is an eMTC dedicated cell.
then one or more of the following is determined:
the position of a starting OFDM symbol of MPDCCH is a predefined value, e.g., 0 (i.e., the first symbol in a subframe, also referred to as symbol 0).
the position of a starting OFDM symbol of PDSCH is a predefined value, e.g., 0 (i.e., the first symbol in a subframe, also referred to as symbol 0).
where
the PDSCH may be a PDSCH that does not carry SIB1-BR.
the position of the starting OFDM symbol may be a default position of the starting OFDM symbol. For example, the position of the starting OFDM symbol may be reconfigured through other messages.

Optionally, in the second embodiment of the present invention, the term "not transmitted" mentioned may be replaced with the term "not supported", and the term "transmitted" mentioned may be replaced with the term "supported".

Optionally, in the second embodiment of the present invention, the term "does not exist" mentioned may be replaced with the term "does not support", and the term "exist" mentioned may be replaced with the term "support".

Optionally, the UE in the second embodiment of the present invention is an MTC UE.

Embodiment 3

Figure 3:
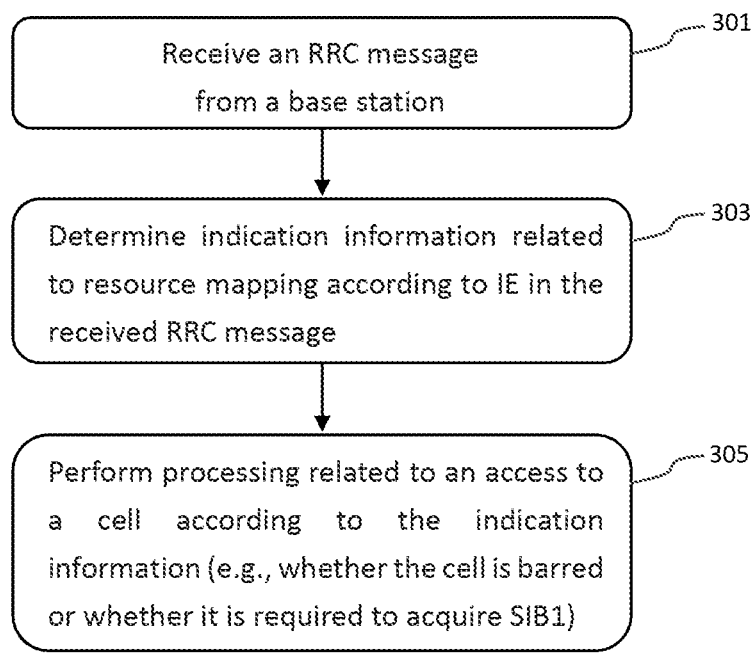
FIG. 3 is a flowchart illustrating a method executed by a user equipment according to a third embodiment of the present invention.

FIG. 3 is a flowchart illustrating a method executed by a user equipment according to a third embodiment of the present invention.

In the third embodiment of the present invention, the user equipment UE executes the following steps:

In step 301, an RRC message is received from, for example, a base station. Optionally, the RRC message may be an MIB. Optionally, the RRC message may be an RRC connection reconfiguration message.

In step 303, indication information related to resource mapping is determined according to one or more information elements (IEs) or a portion of one information element (IE) in the received RRC message. For example, one or more of the following in the indication information is determined:
whether the position of a starting OFDM symbol of MPDCCH is 0; for example, a taken value can be "true" of "false".
whether the position of a starting OFDM symbol of PDSCH is 0; for example, a taken value can be "true" of "false".
the position of a starting OFDM symbol of MPDCCH; for example, a taken value can be 0, 1, 2, 3, or 4. Optionally, the taken value may be 0, 1, 2, or 3 when the downlink system bandwidth is greater than 10 physical resource blocks, and may be 0, 2, 3, or 4 when the downlink system bandwidth is less than or equal to 10 physical resource blocks.
the position of a starting OFDM symbol of PDSCH; for example, a taken value can be 0, 1, 2, 3, or 4. Optionally, the taken value may be 0, 1, 2, or 3 when the downlink system bandwidth is greater than 10 physical resource blocks, and may be 0, 2, 3, or 4 when the downlink system bandwidth is less than or equal to 10 physical resource blocks.
where
the PDSCH may be a PDSCH that does not carry SIB1-BR.
the position of the starting OFDM symbol may be a default position of the starting OFDM symbol. For example, the position of the starting OFDM symbol may be reconfigured through other messages.

Optionally, in step 305, processing related to an access to a cell is performed according to the indication information received in step 303; for example, one or more of the following is determined:
whether the cell is barred.
whether it is required to acquire SIB1.

For example, if the indication information indicates one or more of the following:
   the position of a starting OFDM symbol of MPDCCH is 0 (i.e., the first symbol in a subframe, also referred to as symbol 0).
   the position of a starting OFDM symbol of PDSCH is 0 (i.e., the first symbol in a subframe, also referred to as symbol 0).
then one or more of the following is determined:
   the cell is barred.
   it is not required to acquire SIB1.
For another example, if the indication information indicates one or more of the following:
   the position of a starting OFDM symbol of MPDCCH is not 0 (i.e., the first symbol in a subframe, also referred to as symbol 0).
   the position of a starting OFDM symbol of PDSCH is not 0 (i.e., the first symbol in a subframe, also referred to as symbol 0).
then one or more of the following is determined:
   the cell is accessible.
   it is required to acquire SIB1.
Optionally, the UE in the third embodiment of the present invention is a non-MTC UE.

Embodiment 4

Figure 4:
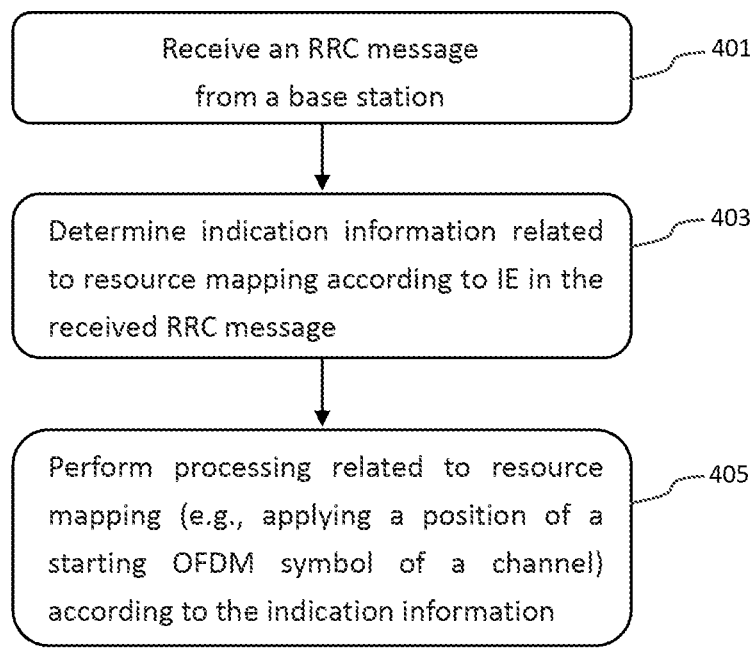
FIG. 4 is a flowchart illustrating a method executed by a user equipment according to a fourth embodiment of the present invention.

FIG. 4 is a flowchart illustrating a method executed by a user equipment according to a fourth embodiment of the present invention.

In the fourth embodiment of the present invention, the user equipment UE executes the following steps:

In step 401, an RRC message is received from, for example, a base station. Optionally, the RRC message may be an MIB. Optionally, the RRC message may be an RRC connection reconfiguration message.

In step 403, indication information related to resource mapping is determined according to one or more information elements (IEs) or a portion of one information element (IE) in the received RRC message. For example, one or more of the following in the indication information is determined:
   whether the position of a starting OFDM symbol of MPDCCH is 0; for example, a taken value can be "true" of "false".
   whether the position of a starting OFDM symbol of PDSCH is 0; for example, a taken value can be "true" of "false".
   the position of a starting OFDM symbol of MPDCCH; for example, a taken value can be 0, 1, 2, 3, or 4. Optionally, the taken value may be 0, 1, 2, or 3 when the downlink system bandwidth is greater than 10 physical resource blocks, and may be 0, 2, 3, or 4 when the downlink system bandwidth is less than or equal to 10 physical resource blocks.
   the position of a starting OFDM symbol of PDSCH; for example, a taken value can be 0, 1, 2, 3, or 4. Optionally, the taken value may be 0, 1, 2, or 3 when the downlink system bandwidth is greater than 10 physical resource blocks, and may be 0, 2, 3, or 4 when the downlink system bandwidth is less than or equal to 10 physical resource blocks.
where
   the PDSCH may be a PDSCH that does not carry SIB1-BR.
   the position of the starting OFDM symbol may be a default position of the starting OFDM symbol. For example, the position of the starting OFDM symbol may be reconfigured through other messages.

Optionally, in step 405, processing related to the resource mapping is performed according to the indication information received in step 403; for example, one or more of the following is performed:
   applying the determined position of the starting OFDM symbol of MPDCCH; for example, when a modulated symbol of MPDCCH (optionally, after operations such as layer mapping and precoding are performed) is mapped to a resource element, the symbol number of the mapped resource element in the first slot of one subframe is greater than or equal to the determined position of the starting OFDM symbol of MPDCCH.
   applying the determined position of the starting OFDM symbol of PDSCH; for example, when a modulated symbol of PDSCH (optionally, after operations such as layer mapping and precoding are performed) is mapped to a resource element, the symbol number of the mapped resource element in the first slot of one subframe is greater than or equal to the determined position of the starting OFDM symbol of PDSCH.

Optionally, the UE in the fourth embodiment of the present invention is an MTC UE.

Embodiment 5

Figure 5:
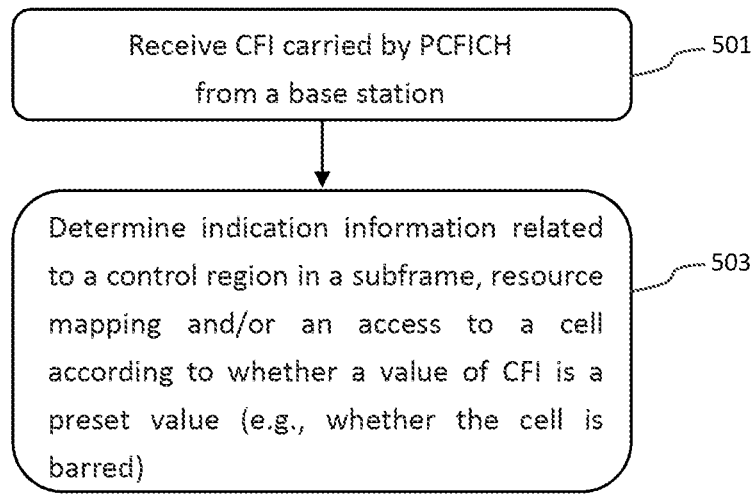
FIG. 5 is a flowchart illustrating a method executed by a user equipment according to a fifth embodiment of the present invention.

FIG. 5 is a flowchart illustrating a method executed by a user equipment according to a fifth embodiment of the present invention.

In the fifth embodiment of the present invention, the user equipment UE executes the following steps:

In step 501, a CFI carried by PCFICH is received from, for example, a base station. For example, the CFI carried by PCFICH is received from a predefined set of resource elements in the first OFDM symbol of a subframe.

In step 503, indication information related to a control region in a subframe, resource mapping and/or an access to a cell is determined according to whether a value of the CFI is a preset value. For example, if the value of the received CFI is equal to the preset value, one or more of the following is determined:
   PDCCH is not transmitted.
   PHICH is not transmitted.
   the position of a starting OFDM symbol of MPDCCH is 0 (i.e., the first symbol in a subframe, also referred to as symbol 0).
   the position of a starting OFDM symbol of PDSCH is 0 (i.e., the first symbol in a subframe, also referred to as symbol 0).
   the cell is an eMTC dedicated cell, e.g., only MTC UE is allowed to access the cell, only category M1 UE is allowed to access the cell, only category M2 UE is allowed to access the cell, or only category M1 UE or category M2 UE is allowed to access the cell.
   the cell is barred.
   it is not required to acquire SIB1.
   Optionally, the preset value may be equal to 4.
Optionally, in the fifth embodiment of the present invention, the term "not transmitted" mentioned may be replaced with the term "not supported".

Optionally, the PDSCH mentioned in the fifth embodiment of the present invention is a PDSCH that does not carry SIB1-BR.

Optionally, the position of the starting OFDM symbol may be a default position of the starting OFDM symbol. For example, the position of the starting OFDM symbol may be reconfigured through other messages.

Optionally, the PCFICH mentioned in the fifth embodiment of the present invention is transmitted only in the subframe 5 of an even numbered system frame (assuming that the first subframe of one system frame is subframe 0).

Optionally, in the fifth embodiment of the present invention, PCFICH is not transmitted in all other subframes except subframe 5 of an even numbered system frame (assuming that the first subframe of one system frame is subframe 0).

Optionally, the UE in the fifth embodiment of the present invention is a non-MTC UE.

Embodiment 6

Figure 6:
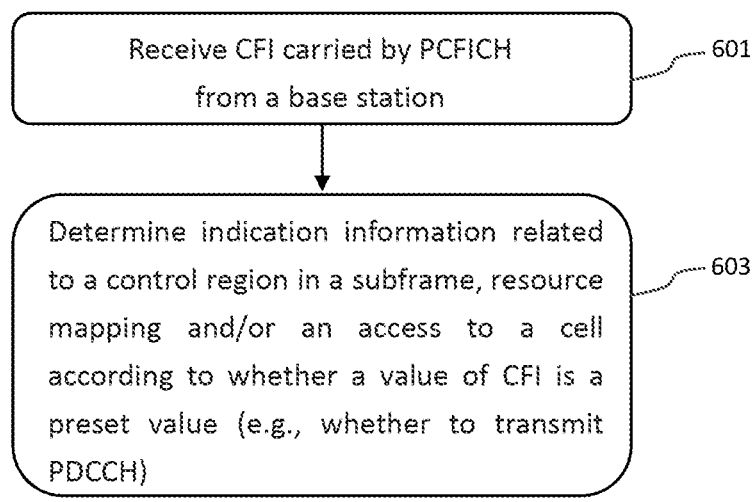
FIG. 6 is a flowchart illustrating a method executed by a user equipment according to a sixth embodiment of the present invention.

FIG. 6 is a flowchart illustrating a method executed by a user equipment according to a sixth embodiment of the present invention.

In the sixth embodiment of the present invention, the user equipment UE executes the following steps:

In step 601, a CFI carried by PCFICH is received from, for example, a base station. For example, the CFI carried by PCFICH is received from a predefined set of resource elements in the first OFDM symbol of a subframe.

In step 603, indication information related to a control region in a subframe, resource mapping and/or an access to a cell is determined according to whether a value of the CFI is a preset value. For example, if the value of the received CFI is equal to the preset value, one or more of the following is determined:

PDCCH is not transmitted.
PHICH is not transmitted.
the position of a starting OFDM symbol of MPDCCH is 0 (i.e., the first symbol in a subframe, also referred to as symbol 0).
the position of a starting OFDM symbol of PDSCH is 0 (i.e., the first symbol in a subframe, also referred to as symbol 0).
the cell is an eMTC dedicated cell, e.g., only MTC UE is allowed to access the cell, only category M1 UE is allowed to access the cell, only category M2 UE is allowed to access the cell, or only category M1 UE or category M2 UE is allowed to access the cell.

Optionally, the preset value may be equal to 4.

Optionally, in the sixth embodiment of the present invention, the term "not transmitted" mentioned may be replaced with the term "not supported".

Optionally, the PDSCH mentioned in the sixth embodiment of the present invention is a PDSCH that does not carry SIB1-BR.

Optionally, the position of the starting OFDM symbol may be a default position of the starting OFDM symbol. For example, the position of the starting OFDM symbol may be reconfigured through other messages.

Optionally, the PCFICH mentioned in the sixth embodiment of the present invention is transmitted only in the subframe 5 of an even numbered system frame (assuming that the first subframe of one system frame is subframe 0).

Optionally, in the sixth embodiment of the present invention, PCFICH is not transmitted in all other subframes except subframe 5 of an even numbered system frame (assuming that the first subframe of one system frame is subframe 0)

Optionally, the UE in the sixth embodiment of the present invention is an MTC UE.

Embodiment 7

Figure 7:
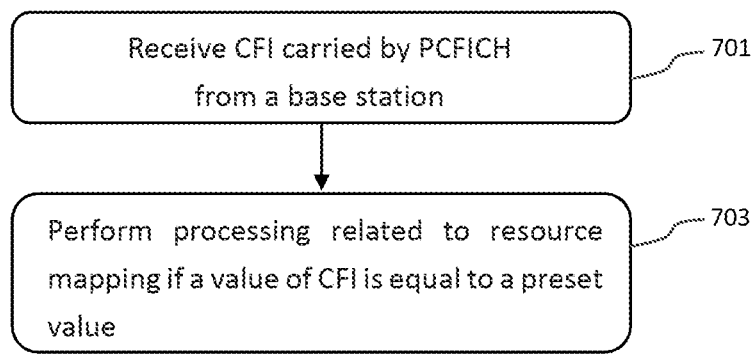
FIG. 7 is a flowchart illustrating a method executed by a user equipment according to a seventh embodiment of the present invention.

FIG. 7 is a flowchart illustrating a method executed by a user equipment according to a seventh embodiment of the present invention.

In the seventh embodiment of the present invention, the user equipment UE executes the following steps:

In step 701, a CFI carried by PCFICH is received from, for example, a base station. For example, the CFI carried by PCFICH is received from a predefined set of resource elements in the first OFDM symbol of a subframe.

In step 703, processing related to resource mapping is performed if a value of the received CFI is equal to a preset value; for example, one or more of the following is performed:

applying the position of a starting OFDM symbol of MPDCCH that is equal to 0; for example, when a modulated symbol of MPDCCH (optionally, after operations such as layer mapping and precoding are performed) is mapped to a resource element, the symbol number of the mapped resource element in the first slot of one subframe is greater than or equal to 0.
when one or more modulated symbols of MPDCCH (optionally, after operations such as layer mapping and precoding are performed) are mapped to one or more resource elements, a resource element occupied by PCFICH is not counted as the one or more resource elements.
applying the position of a starting OFDM symbol of PDSCH that is equal to 0; for example, when a modulated symbol of PDSCH (optionally, after operations such as layer mapping and precoding are performed) is mapped to a resource element, the symbol number of the mapped resource element in the first slot of one subframe is greater than or equal to 0.
when a modulated symbol of PDSCH (optionally, after operations such as layer mapping and precoding are performed) is mapped to a resource element, a resource element occupied by PCFICH is not counted in the mapped resource element.

Optionally, the preset value may be equal to 4.

Optionally, the PDSCH mentioned in the seventh embodiment of the present invention is a PDSCH that does not carry SIB1-BR.

Optionally, the position of the starting OFDM symbol may be a default position of the starting OFDM symbol. For example, the position of the starting OFDM symbol may be reconfigured through other messages.

Optionally, the PCFICH mentioned in the seventh embodiment of the present invention is transmitted only in the subframe 5 of an even numbered system frame (assuming that the first subframe of one system frame is subframe 0).

Optionally, in the seventh embodiment of the present invention, PCFICH is not transmitted in all other subframes except subframe 5 of an even numbered system frame (assuming that the first subframe of one system frame is subframe 0).

Optionally, the UE in the seventh embodiment of the present invention is an MTC UE.

According to the embodiments described above, the user equipment is made able to speed up cell selection and save power consumption. For example, a non-MTC UE is made able to identify a barred cell under the stand-alone deployment for eMTC as quick as possible, or a MTC UE is made able to identify an accessible cell as quick as possible and perform corresponding processing, so as to speed up cell selection and saving power consumption.

Embodiment 8

Figure 8:
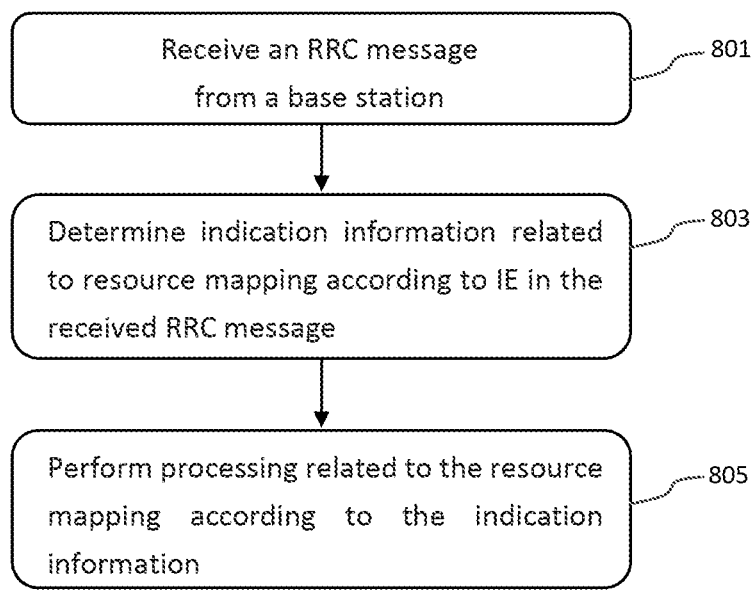
FIG. 8 is a flowchart illustrating a method executed by a user equipment according to an eighth embodiment of the present invention.

FIG. 8 is a flowchart illustrating a method executed by a user equipment according to an eighth embodiment of the present invention.

In the eighth embodiment of the present invention, the user equipment UE executes the following steps:

In step 801, an RRC message is received from, for example, a base station. The RRC message may be a UE-specific RRC message or a cell-specific RRC message.

In step 803, indication information related to resource mapping is determined according to one or more information elements (IEs) or a portion of one information element (IE) in the received RRC message. For example, one or more of the following in the indication information is determined:

the position of a starting OFDM symbol of MPDCCH; for example, a taken value can be 0, 1, 2, 3, or 4. Optionally, the taken value may be 0, 1, 2, or 3 when the downlink system bandwidth is greater than 10 physical resource blocks, and may be 0, 2, 3, or 4 when the downlink system bandwidth is less than or equal to 10 physical resource blocks.

the position of a starting OFDM symbol of PDSCH; for example, a taken value can be 0, 1, 2, 3, or 4. Optionally, the taken value may be 0, 1, 2, or 3 when the downlink system bandwidth is greater than 10 physical resource blocks, and may be 0, 2, 3, or 4 when the downlink system bandwidth is less than or equal to 10 physical resource blocks.

where the PDSCH may be a PDSCH that does not carry SIB1-BR.

the position of a starting OFDM symbol of the MPDCCH and the position of a starting OFDM symbol of the PDSCH may be the same or different.

Optionally, in step 805, processing related to the resource mapping is performed according to the indication information received in step 803; for example, one or more of the following actions is performed:

applying the determined position of the starting OFDM symbol of MPDCCH; for example, when a modulated symbol of MPDCCH (optionally, after operations such as layer mapping and precoding are performed) is mapped to a resource element, the symbol number of the mapped resource element in the first slot of one subframe is greater than or equal to the determined position of the starting OFDM symbol of MPDCCH.

applying the determined position of the starting OFDM symbol of PDSCH; for example, when a modulated symbol of PDSCH (optionally, after operations such as layer mapping and precoding are performed) is mapped to a resource element, the symbol number of the mapped resource element in the first slot of one subframe is greater than or equal to the determined position of the starting OFDM symbol of PDSCH.

Optionally, the UE in the eighth embodiment of the present invention is an MTC UE.

Embodiment 9

Figure 9:
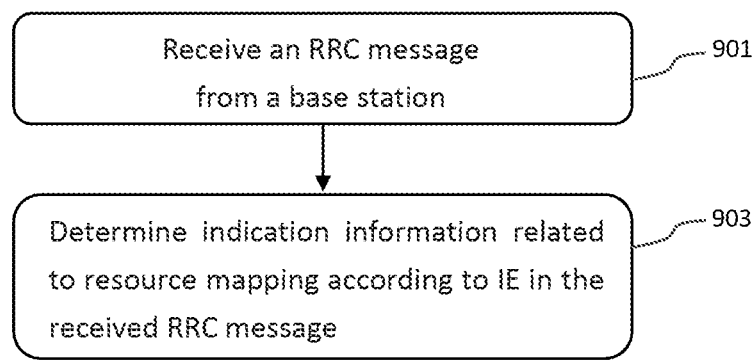
FIG. 9 is a flow chart illustrating a method executed by a user equipment according to a ninth embodiment of the present invention.

FIG. 9 is a flow chart illustrating a method executed by a user equipment according to a ninth embodiment of the present invention.

In the ninth embodiment of the present invention, the user equipment UE executes the following steps:

In step 901, an RRC message is received from, for example, a base station. The RRC message may be a UE-specific RRC message or a cell-specific RRC message.

In step 903, indication information related to resource mapping is determined according to one or more information elements (IEs) or a portion of one information element (IE) in the received RRC message. For example, one or more of the following in the indication information is determined:

when a modulated symbol of MPDCCH (optionally, after operations such as layer mapping and precoding are performed) is mapped to a resource element, a resource element occupied by PCFICH is not counted in the mapped resource element.

when a modulated symbol of PDSCH (optionally, after operations such as layer mapping and precoding are performed) is mapped to a resource element, a resource element occupied by PCFICH is not counted in the mapped resource element.

Optionally, the PCFICH mentioned in the ninth embodiment of the present invention is transmitted only in the subframe 5 of an even numbered system frame (assuming that the first subframe of one system frame is subframe 0).

Optionally, in the ninth embodiment of the present invention, PCFICH is not transmitted in all other subframes except subframe 5 of an even numbered system frame (assuming that the first subframe of one system frame is subframe 0).

Optionally, the UE in the ninth embodiment of the present invention is an MTC UE.

According to the eighth embodiment and ninth embodiment of the present invention, a base station is made able to allocate resource mapping schemes of different channels for user equipments UE respectively and perform corresponding processing, so as to enable more flexible and effective use of communication resources.

Each of the embodiments and implementations described above can be combined with each other under a condition where there is no contradiction. For example, the sixth embodiment and the seventh embodiment may be combined to be used. At this time, if a value of the received CFI is equal to a preset value, then an MTC UE may not only perform the operation in the sixth embodiment but also perform the operation in the seventh embodiment. For another example, the eighth embodiment and the ninth embodiment may be combined to be used. At this time, an MTC UE may perform the operation in the eighth embodiment according to an indication of an RRC message 1, and may perform the operation in the ninth embodiment according to an indication of an RRC message 2, wherein the RRC message 1 and the RRC message 2 may be the same RRC message or may be different RRC messages.

In the above embodiments and implementations, the cell may refer to a cell that the UE is trying to access, may refer to a current serving cell, or may also refer to a target serving cell in a handover process.

Figure 10:
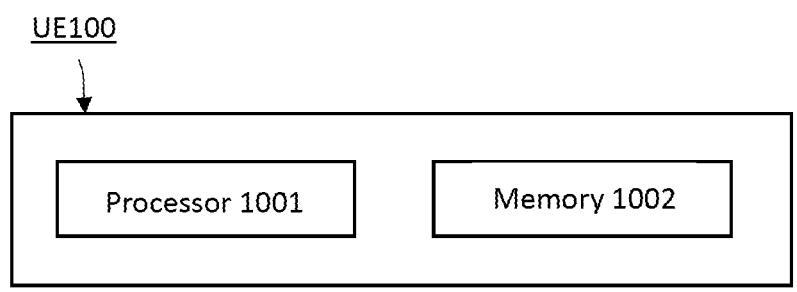
FIG. 10 is a block diagram showing a user equipment according to the present invention.

FIG. 10 is a block diagram showing a user equipment UE according to the present invention. As shown in FIG. 10, the user equipment UE 100 includes a processor 1001 and a memory 1002. The processor 1001 may include, for example, a microprocessor, a microcontroller, an embedded processor, or the like. The memory 1002 may include, for example, a volatile memory (e.g., random access memory; RAM), a hard disk drive (HDD), a non-volatile memory (e.g., flash memory), or other memory. The memory 1002 has program instructions stored thereon. The instructions, when executed by the processor 1001, may perform the methods executed by the user equipment described above in detailed according to the present invention.

The program running on an equipment according to the present invention may be a program that enables a computer to implement the functions of the embodiments of the present invention by controlling a central processing unit (CPU). The program or information processed by the program may be temporarily stored in a volatile memory (e.g., random access memory (RAM)), a hard disk drive (HDD), a non-volatile memory (e.g., flash memory), or other memory systems.

The program for implementing the functions of each of the embodiments according to the present invention may be recorded on a computer-readable recording medium. The corresponding functions can be achieved by causing a computer system to read programs recorded on the recording medium and execute the programs. The so-called "computer system" herein may be a computer system embedded in the equipment, and may include an operating system or hardware (e.g., peripheral devices). The "computer-readable recording medium" may be a semiconductor recording medium, an optical recording medium, a magnetic recording medium, a recording medium for dynamically storing programs for a short time, or any other recording medium readable by a computer.

Various features or functional modules of the equipment used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, the present invention may also be implemented using these new integrated circuit technologies.

Furthermore, the present invention is not limited to the embodiments described above. Although various examples of the embodiments have been described, the present invention is not limited thereto. Fixed or non-mobile electronic equipments installed indoors or outdoors may be used as terminal equipments or communication equipments, such as AV equipments, kitchen equipments, cleaning equipments, air conditioners, office equipments, vending machines, and other household appliances.

As above, the embodiments of the present invention have been described in detail with reference to the accompanying drawings. However, the specific structure is not limited to the embodiments described above, and the present invention also includes any design changes without departing from the spirit of the present invention. In addition, various modifications can be made to the present invention within the scope of the claims, and embodiments obtained by appropriately combining the technical means disclosed in different embodiments are also included in the technical scope of the present invention. In addition, components having the same effect described in the above embodiments may be substituted for each other.

What is claimed is:

1. A method executed by a machine type communication (MTC) user equipment (UE), the method comprising:
   receiving a radio resource control (RRC) message in a first physical downlink shared channel (PDSCH);
   in response to the RRC message including a first information element (IE), determining, based on the first IE, a first starting symbol for mapping an MTC physical downlink control channel (MPDCCH) and a second PDSCH, the first starting symbol being not in a control region for a non-MTC UE;
   in response to the RRC message including a second IE, determining, based on the second IE, a second starting symbol for mapping the MPDCCH and the second PDSCH, the second starting symbol being in the control region for the non-MTC UE; and
   receiving the MPDCCH and the second PDSCH, wherein:
   an index of the first starting symbol is 1, 2, 3 or 4, and
   an index of the second starting symbol is 0.

2. A machine type communication (MTC) user equipment (UE) for speeding up cell selection and saving power consumption, the MTC UE comprising:
   one or more non-transitory computer-readable media having computer-executable instructions embodied thereon; and
   at least one processor coupled to the one or more non-transitory computer-readable media, the at least one processor being configured to execute the computer-executable instructions to:
   receive a radio resource control (RRC) message in a first physical downlink shared channel (PDSCH),
   in response to the RRC message including a first information element (IE), determine, based on the first IE, a first starting symbol for mapping an MTC physical downlink control channel (MPDCCH) and a second PDSCH, the first starting symbol being not in a control region for a non-MTC UE,
   in response to the RRC message including a second IE, determine, based on the second IE, a second starting symbol for mapping the MPDCCH and the second PDSCH, the second starting symbol being in the control region for the non-MTC UE, and
   receive the MPDCCH and the second PDSCH, wherein:
   an index of the first starting symbol is 1, 2, 3 or 4, and
   an index of the second starting symbol is 0.

* * * * *